(12) United States Patent
Nakamura

(10) Patent No.: US 8,643,873 B2
(45) Date of Patent: Feb. 4, 2014

(54) IMAGE FORMING APPARATUS, AND CONTROL METHOD AND STORAGE MEDIUM THEREFOR

(75) Inventor: Tadahiro Nakamura, Yokohama (JP)

(73) Assignee: Canon Kabushiki Kaisha (JP)

( * ) Notice: Subject to any disclaimer, the term of this patent is extended or adjusted under 35 U.S.C. 154(b) by 945 days.

(21) Appl. No.: 12/620,333

(22) Filed: Nov. 17, 2009

(65) Prior Publication Data
US 2010/0123932 A1    May 20, 2010

(30) Foreign Application Priority Data

Nov. 20, 2008   (JP) .................................. 2008-296732

(51) Int. Cl.
*G06F 3/12* (2006.01)
(52) U.S. Cl.
USPC ....... 358/1.15; 358/1.16; 358/1.18; 358/1.13; 358/1.1; 709/217; 709/218
(58) Field of Classification Search
None
See application file for complete search history.

(56) References Cited

U.S. PATENT DOCUMENTS

| 7,933,035 | B2 * | 4/2011 | Okada et al. ................. 358/1.15 |
| 8,139,241 | B2 * | 3/2012 | Okada et al. ................. 358/1.14 |
| 2003/0107761 | A1 * | 6/2003 | Kimura ........................ 358/1.15 |
| 2006/0092453 | A1 * | 5/2006 | Okada et al. ................. 358/1.14 |
| 2006/0114492 | A1 * | 6/2006 | Noda ........................... 358/1.14 |
| 2007/0081186 | A1 * | 4/2007 | Numata ....................... 358/1.15 |
| 2007/0091361 | A1 * | 4/2007 | Matsugashita ............... 358/1.15 |
| 2007/0115494 | A1 * | 5/2007 | Nakayama ................... 358/1.14 |
| 2007/0146778 | A1 * | 6/2007 | Kitagata et al. .............. 358/1.15 |
| 2007/0288544 | A1 * | 12/2007 | Nakamura et al. ........... 709/201 |
| 2008/0055641 | A1 * | 3/2008 | Murata et al. ............... 358/1.15 |
| 2008/0155563 | A1 * | 6/2008 | Nakamura ................... 719/318 |
| 2009/0182839 | A1 * | 7/2009 | Nakamura ................... 709/217 |

FOREIGN PATENT DOCUMENTS

JP    2004-164233 A    6/2004

OTHER PUBLICATIONS

The Printer Working Group (PWG) Internet Printing Protocol (IPP) Work Group's Homepage, searched Sep. 3, 2008, <URL:http://www.pwg.org/ipp/>.

* cited by examiner

*Primary Examiner* — Hilina K Demeter
(74) *Attorney, Agent, or Firm* — Rossi, Kimms & McDowell LLP

(57) ABSTRACT

An image forming apparatus capable of preventing unauthorized printing while reducing manager's work load. IP addresses of host computers for which printing should be permitted are registered beforehand in a print permission list. When a print job is received, whether the IP address of a host computer from which the print job has been transmitted is present in the list is determined. If the IP address is not present, the received print job is not printed but stored. Subsequently, when the print job is selected and a print instruction is given, printing is executed. If the print instruction has once been given to the stored print job, the IP address of the host computer is added to the list. Subsequently, printing is executed without any print instruction when a print job is transmitted.

11 Claims, 14 Drawing Sheets

FIG.6

| No | JOB NAME | USER NAME | IP ADDRESS | STATUS |
|----|----------|-----------|------------|--------|
| 5001 | TEST.doc | user1 | 192.168.0.1 | STOPPED |
| 5002 | ABC.doc | user1 | 192.168.0.1 | STOPPED |
| 5003 | XXX.doc | user100 | 192.168.0.100 | STOPPED |

[PRINT] [DELETE] [OK]
  501     502

FIG.7

IP ADDRESSES FOR WHICH PRINTING IS PERMITTED

192.168.0.123
192.168.1.1
192.168.2.100
192.168.3.200

[ADD] [DELETE] [OK]
 602    601

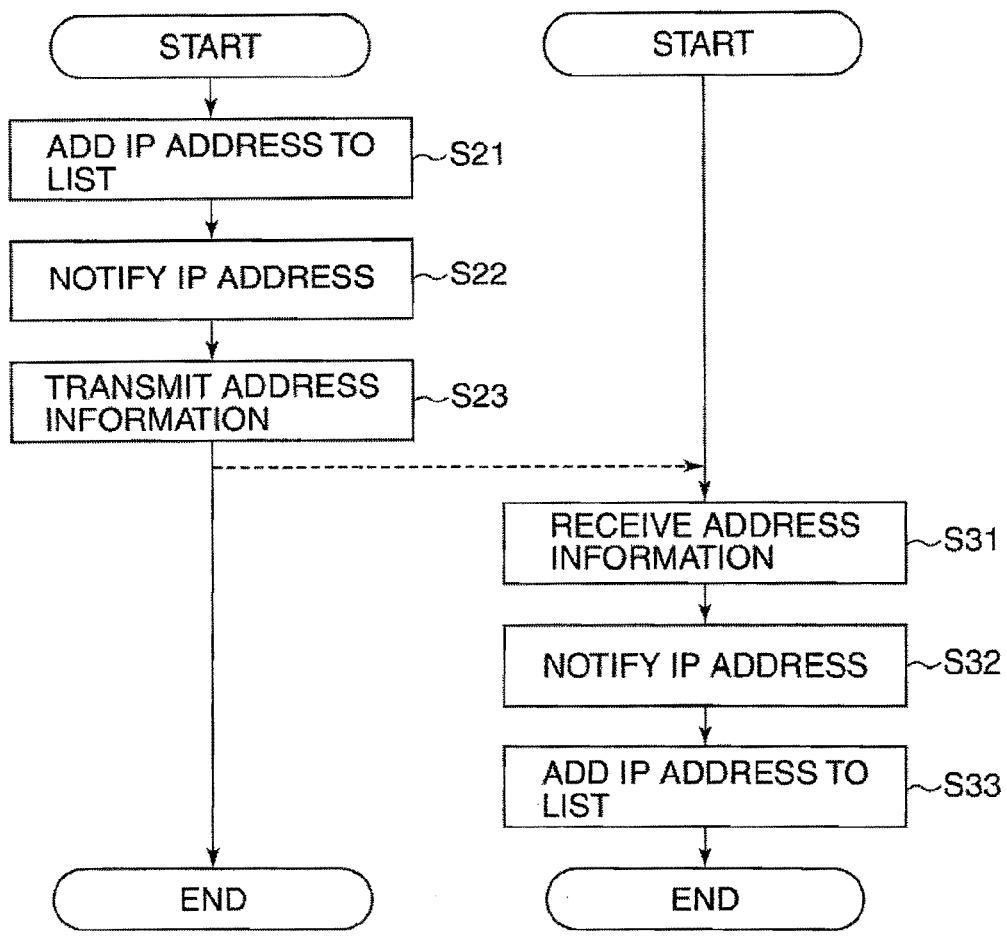

FIG.13

| JOB LIST | | | | | |
|---|---|---|---|---|---|
| ADDRESS | http://192.168.0.5/joblist.html | | | | |

JOB STATUS

| | No | JOB NAME | USER NAME | IP ADDRESS | JOB STATUS | JOB IDENTIFIER |
|---|---|---|---|---|---|---|
| ◯ | 5001 | TEST.doc | user1 | 192.168.0.1 | STOPPED | 57489801 |
| ◯ | 5002 | ABC.doc | user2 | 192.168.0.100 | STOPPED | 68934522 |

1201

1202

ENTER JOB IDENTIFIER OF JOB TO BE PRINTED

[    ] 1203

[PRINT] 1204

FIG.17

| No | JOB NAME | USER NAME | IP ADDRESS | STATUS |
|---|---|---|---|---|
| 5001 | TEST.doc | user1 | 192.168.0.1 | STOPPED DUE TO UPPER LIMIT PRINT NUMBER BEING EXCEEDED |

PRINT  DELETE  OK
501     502

FIG.18

| IP ADDRESSES FOR WHICH PRINTING IS PERMITTED | UPPER LIMIT NUMBER OF SHEETS |
|---|---|
| 192.168.0.1 | 100 |
| 192.168.0.5 | 100 |
| 192.168.1.100 | 250 |
| 192.168.1.101 | infinite |
|  |  |

1401

IMAGE FORMING APPARATUS, AND CONTROL METHOD AND STORAGE MEDIUM THEREFOR

BACKGROUND OF THE INVENTION

1. Field of the Invention

The present invention relates to an image forming apparatus for printing a print job transmitted from an information processing apparatus, and relates to a control method for the image forming apparatus and a storage medium storing a program for executing the control method.

2. Description of the Related Art

Conventionally, a printing apparatus (e.g., image forming apparatus) is connected to a network via which a client PC is able to instruct the printing apparatus to perform printing.

An image forming apparatus heretofore used only in an office can be connected to the Internet to make it possible to instruct, from outside the office, the image forming apparatus to perform printing. In this manner, image forming apparatuses are utilized in new ways such as being used as an alternative to a facsimile machine (FAX), whereby user-friendliness is enhanced.

However, since unspecified person is able to instruct printing via the network (e.g., the Internet), a problem is posed that anonymous users are allowed to make unauthorized printing (e.g., printing of a large number of pages and printing of advertising data) with wrong intention. As a result, consumption articles (e.g., print sheets and toner) are wasted and routine printing work is hindered.

To prevent unauthorized printing, authentication is heretofore implemented, in which a user who transmits a job is identified and printing instructed by a normal user is only authorized. For example, there is IPP (Internet Printing Protocol) prescribed by RFC 2911 or the like. See, PWG IPP Work Group's Homepage, searched Sep. 3, 2008 on the Internet <URL:http://www.pwg.org/ipp/>. In the IPP, HTTP (Hyper Text Transfer Protocol) prescribed by RFC 2616 is used as a transport layer, whereby a user who instructs printing can be authenticated through, e.g., basic authentication or digest authentication in the HTTP protocol.

Another method is to use a dedicated printer driver to make authentication information contained in print data. Authentication can be performed by extracting the authentication information from the print data when the print data is analyzed by the image forming apparatus.

To prevent undesired printing, there is a technique in which received print data is temporarily stored into a storage device, and only print data suited to a printer model is actually printed (see, Japanese Laid-open Patent Publication No. 2004-164233). With this technique, even if unauthorized print data is transmitted without permission, such print data is not printed but deleted if model information contained in the print data does not match the printer. It is therefore possible to prevent sheets from being wastefully output.

However, the prior art image forming apparatus entails the following problem. Specifically, with the above described authentication method, authentication information such as a user name or a password for authentication must be set beforehand in the image forming apparatus, and therefore, a manager is needed to perform laborious work such as maintaining authentication information and matching the authentication information between a plurality of image forming apparatuses.

With the technique disclosed in Japanese Laid-open Patent Publication No. 2004-164233, in a case where print data has a size exceeding a prescribed value, it is possible to perform control to suspend the execution of printing until stored print data is selected and a print instruction to print the selected print data is given by a user. However, even if printing is instructed by a normal user, print data must be selected and a further print instruction must be given each execution of printing in a case that data size exceeds a prescribed value, which lowers user-friendliness.

SUMMARY OF THE INVENTION

The present invention provides an image forming apparatus capable of preventing unauthorized printing while reducing manager's work load, and provides a control method for the image forming apparatus and a storage medium storing a program for executing the control method.

The present invention also provides an image forming apparatus capable of improving security while maintaining user-friendliness, and provides a control method for the apparatus and a storage medium storing a program for executing the method.

According to a first aspect of this invention, there is provided an image forming apparatus for printing a print job, which comprises a registration unit configured to register at least one piece of information that identifies at least one information processing apparatus, a receiving unit configured to receive a print job transmitted from an information processing apparatus, a judgment unit configured to determine whether information that identifies an information processing apparatus from which the received print job has been transmitted has been registered by the registration unit, a job holding unit configured to hold the received print job in a case where it is determined by the judgment unit that the information that identifies the information processing apparatus from which the print job has been transmitted has not been registered by the registration unit, a print instruction acceptance unit configured to accept a print instruction for the held print job, and a printing unit configured to print the held print job in response to the print instruction being accepted by the print instruction acceptance unit, wherein the registration unit registers information that identifies the information processing apparatus having transmitted the print job for which the print instruction is accepted.

According to a second aspect of this invention, there is provided a control method for an image forming apparatus for printing a print job, which comprises a receiving step of receiving a print job transmitted from an information processing apparatus, a judgment step of determining whether information that identifies an information processing apparatus from which the received print job has been transmitted is present in a registration unit in which at least one piece of information that identifies at least one information processing apparatus can be registered, a job holding step of holding the received print job in a case where it is determined in the judgment step that the information that identifies the information processing apparatus from which the print job has been transmitted is not present in the registration unit, a print instruction acceptance step of accepting by the image forming apparatus a print instruction for the held print job, a printing step of printing the held print job by the image forming apparatus in response to the print instruction being accepted by the image forming apparatus, and a registration step of registering, in the registration unit, information that identifies the information processing apparatus having transmitted the print job for which the print instruction is accepted by the image forming apparatus.

According to a third aspect of this invention, there is provided a storage medium storing a control program for causing an image forming apparatus to execute the control method according to the second aspect of this invention.

With this invention, it is possible to prevent unauthorized printing while reducing the work load of the manager of the image forming apparatus.

With this invention, it is also possible to enable the user who has once given a print instruction to print a print job held in the image forming apparatus to immediately perform subsequent printing as usual, making it possible to improve security while maintaining user-friendliness.

Further features of the present invention will become apparent from the following description of exemplary embodiments with reference to the attached drawings.

BRIEF DESCRIPTION OF THE DRAWINGS

FIG. 6 is a view showing an example screen for a print instruction unit shown in FIG. 3;

FIG. 7 is a view showing an example screen for a list management unit shown in FIG. 3;

FIG. 9 is a flowchart showing the procedures of processes performed by two image forming apparatuses when a new IP address is added to a list holding unit of one of the image forming apparatuses;

FIG. 10 is a view showing an example format of address information transmitted from an address transmission unit of the one image forming apparatus to a network;

FIG. 13 is a view showing a job list screen of the image forming apparatus displayed by a web browser;

FIG. 17 is a view showing an example screen for a print instruction unit of the image forming apparatus; and FIG. 18 is a table showing an example of a print permission list held by a list holding unit of the image forming apparatus.

DETAILED DESCRIPTION OF THE PREFERRED EMBODIMENTS

The present invention will now be described in detail below with reference to the drawings showing preferred embodiments thereof.

(First Embodiment)

Figure 1:
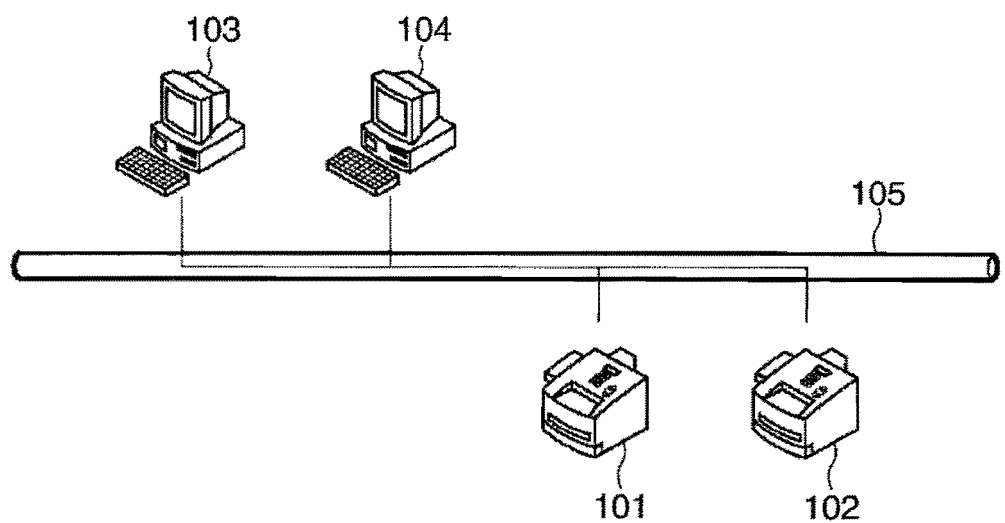
FIG. 1 is a view showing the construction of a printing system including image forming apparatuses according to a first embodiment of this invention.

FIG. 1 show the construction of a printing system including image forming apparatuses according to a first embodiment of this invention. The printing system includes image forming apparatuses 101, 102 and host computers 103, 104 which are connected for communication with one another via a network 105.

The host computers 103, 104 (example of information processing apparatuses) are each configured to transmit via the network 105 a print job to one or both of the image forming apparatuses 101, 102 to cause it or them to perform printing. It should be noted that since the image forming apparatuses 101, 102 are substantially the same in construction as each other, the image forming apparatus 101 is mainly described. The host computers 103, 104 are each implemented by a general-purpose computer.

Figure 2:
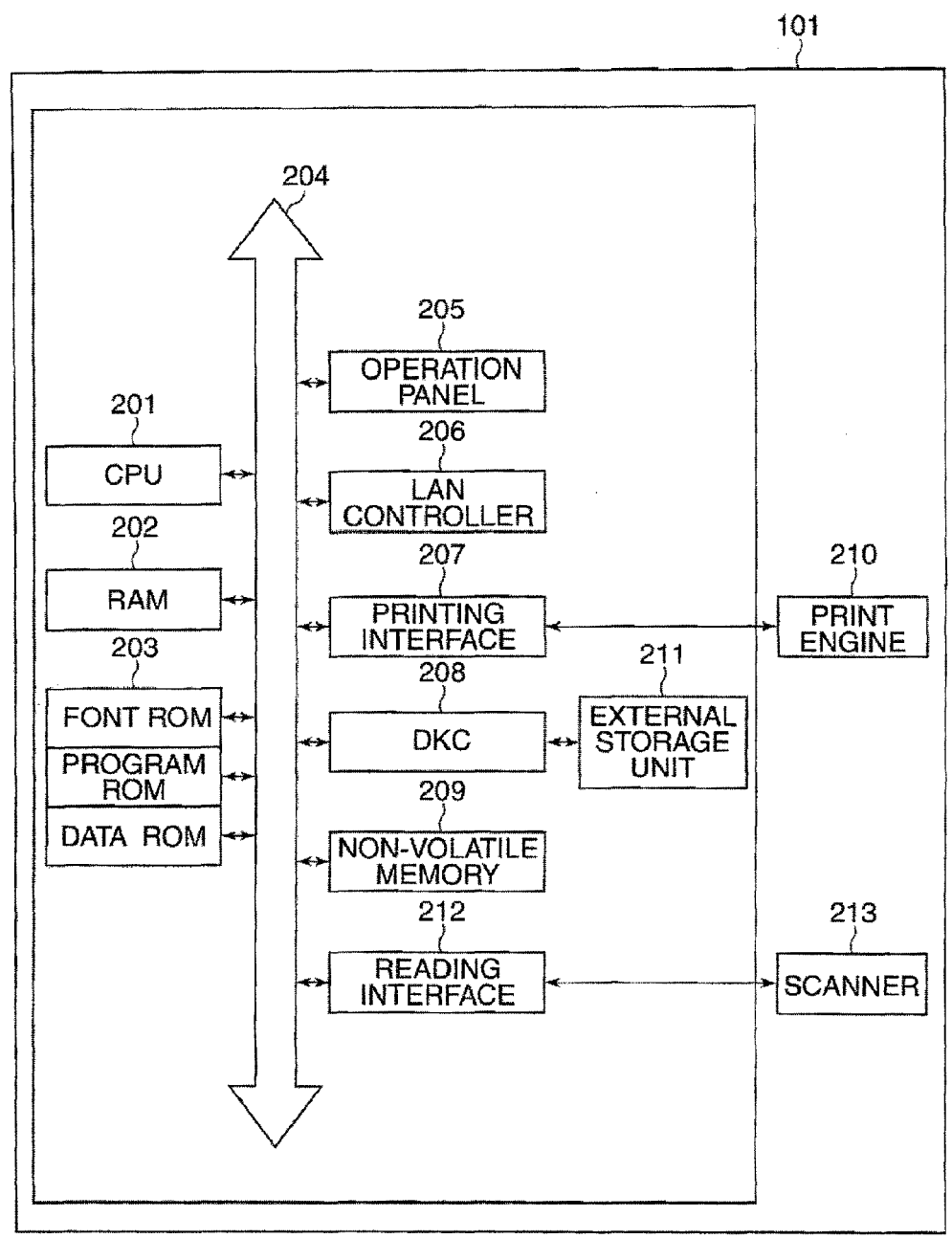
FIG. 2 is a block diagram showing the hardware construction of each image forming apparatus shown in FIG. 1.

FIG. 2 shows in block diagram the hardware construction of the image forming apparatus 101. In this embodiment, an example where a copying machine is used as the image forming apparatus is described. In accordance with a control program stored in a program ROM of a ROM 203 or an external storage unit 211, a CPU 201 of the image forming apparatus 101 overall controls various devices connected to a system bus 204.

The CPU 201 outputs an image signal (output information) to a printing unit (printer engine) 210 connected to the system bus 204 via a printing interface 207, and inputs an image signal from a reading unit (scanner) 213 connected to the system bus 204 via a reading interface 212.

The ROM 203 has a program ROM that stores, e.g., control programs executable by the CPU 201, a font ROM that stores, e.g., font data (including outline font data) for use in generating the output information, and a data ROM that stores, e.g., information for use by the host computers 103, 104.

The CPU 201 of the image forming apparatus 101 is able to communicate via a LAN controller 206 with the host computers 103, 104 and the image forming apparatus 102 on the network 105. The RAM 202 mainly functions, e.g., as a main memory and a work area for the CPU 201. The memory capacity of the RAM 202 can be expanded by means of an option RAM connected to an expansion port, not shown. It should be noted that the RAM 202 is used as an output information developing region, an environment data storage region, etc.

The external storage unit 211 is implemented by a hard disk (HDD). Access to the HDD 211 is controlled by a disk controller (DKC) 208. It should be noted that an IC card or the like may be used instead of the hard disk.

The HDD 211 stores font data, emulation program, form data, etc., and is used as a job storage region for temporarily spooling a print job and externally controlling the spooled print job.

The HDD 211 is also used as a BOX data storage region for holding, as BOX data, image data read by the scanner 213 or image data for a print job. The data held in the HDD 211 is referred to from the network 105, and is printed.

An operation panel (operation unit) 205 has software keys that enable a user to input various information, and accepts a user's operation instruction for the image forming apparatus. The external storage unit (HDD 211) is at least one in number and may be configured to be able to be connected with devices such as an option font card in which built-in font and option font are stored and an external memory in which a program for interpreting printer control language of different language system is stored.

A non-volatile memory 209 stores various setting information, which are set via the operation panel 205. The image forming apparatus 101 can optionally be mounted with extension apparatuses such as a finisher having a stapling or sorting function and an apparatus having a double-sided printing function. Operations of these apparatuses are controlled by the CPU 201.

Figure 3:
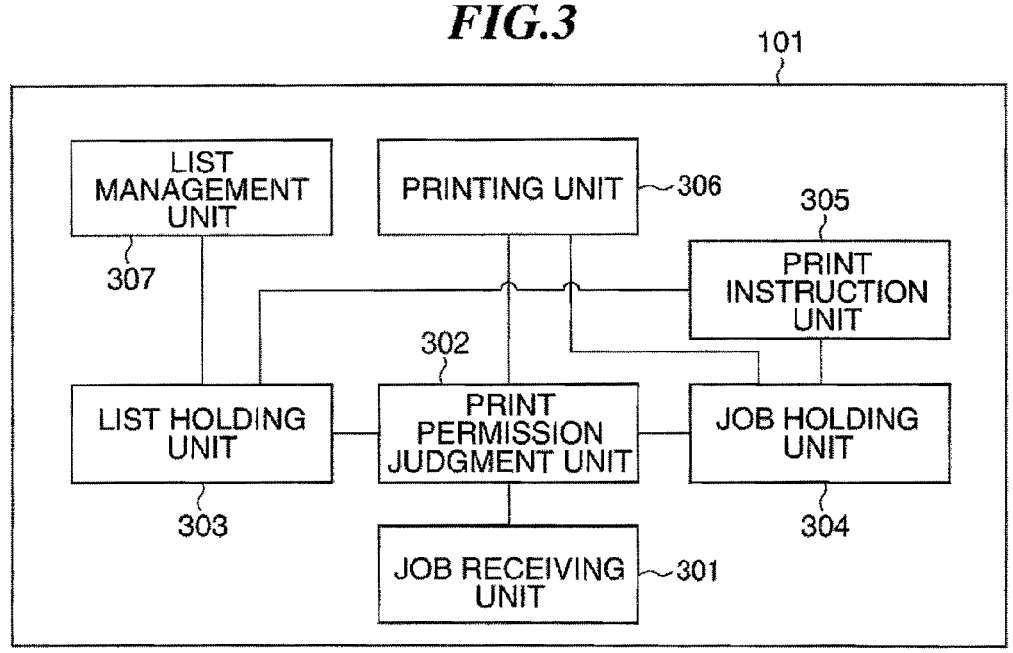
FIG. 3 is a block diagram showing the functional construction of software of the image forming apparatus.

FIG. 3 shows in block diagram the functional construction of software of the image forming apparatus 101. A job receiving unit 301 receives a print job from, e.g., the host computer 103, and transmits the print job to a print permission judgment unit 302. Based on a print permission list (see FIG. 4) held in a list holding unit 303, the print permission judgment unit 302 determines whether the received print job can be printed. If the print job is not permitted to be printed, the print job is stored into a job holding unit 304.

A print instruction unit 305 confirms a list of jobs and gives a print instruction. A printing unit 306 develops a print job into a bitmap and prints the print job on a sheet. A list management unit 307 manages the print permission list held in the list holding unit 303.

It should be noted that pieces of software for achieving the function blocks shown in FIG. 3 are stored in the HDD 211 or the ROM 203 of the image forming apparatus 101, are loaded as executable programs into the RAM 202 when the image forming apparatus 101 is activated, and are then concurrently executed by the CPU 201. The job holding unit 304 stores a print job into the HDD 211. The list holding unit 303 stores the list into the non-volatile memory 209.

Figure 4:
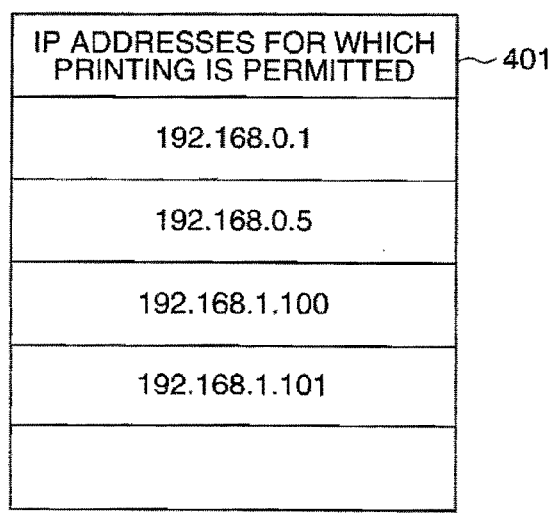
FIG. 4 is a table showing an example of a print permission list held by a list holding unit shown in FIG. 3.

FIG. 4 is a table showing an example of the print permission list. In the table, a list (print permission list) 401 of IP addresses of host computers for which printing should be permitted is held (registered). When an instruction to print a print job is given from any of the host computers having the IP addresses listed on the list 401, printing of the print job is immediately started without waiting a user's print start instruction. Some IP address is added or deleted by a method described later.

Figure 5:
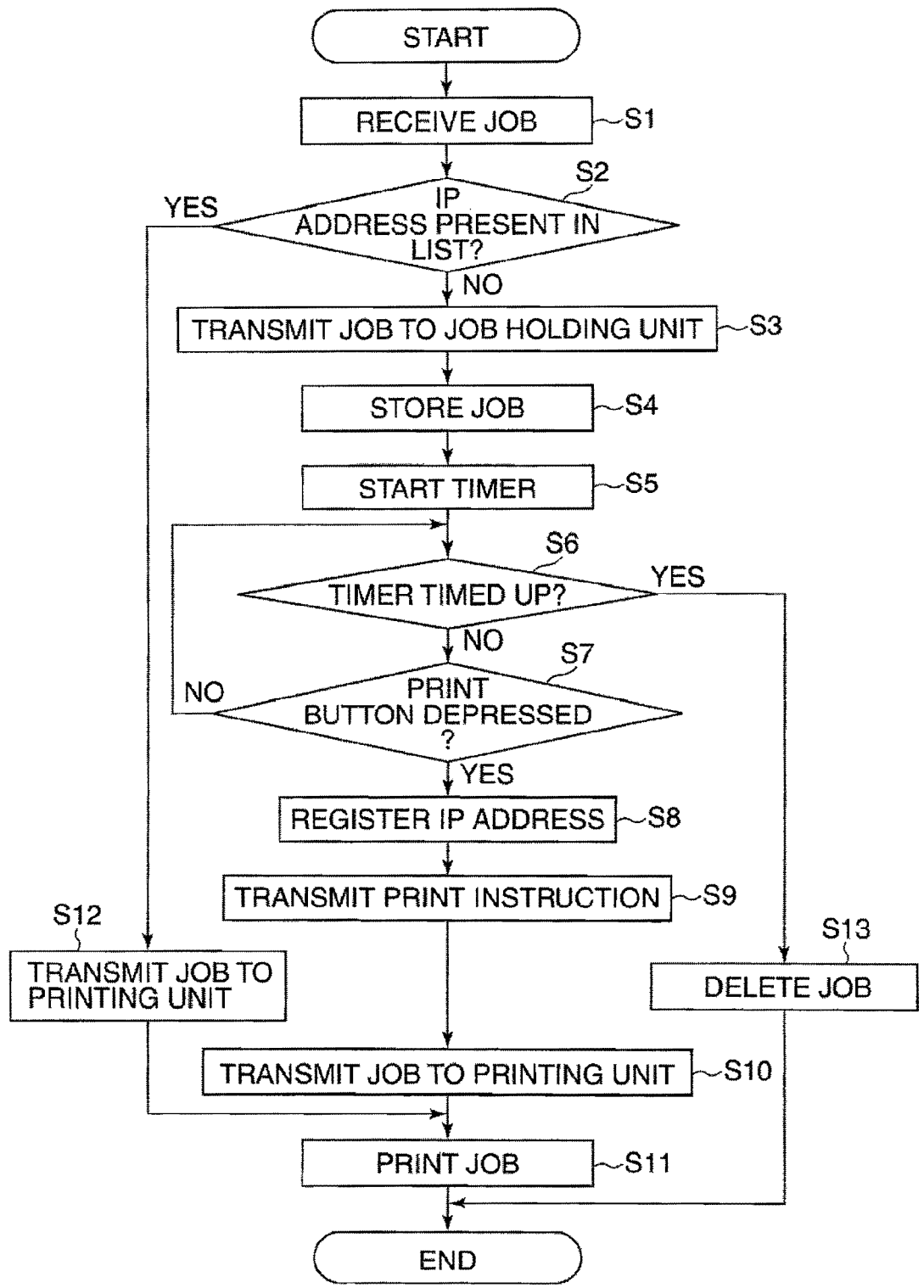
FIG. 5 is a flowchart showing the procedures of a printing process performed by the image forming apparatus that receives a print job.

FIG. 5 shows in flowchart the procedures of a printing process performed by the image forming apparatus 101. In the printing process, the job receiving unit 301 of the image forming apparatus 101 receives a print job from, e.g., the host computer 103 (step S1), acquires an IP address of the host computer from which the print job has been transmitted, and transmits the received print job and the acquired IP address to the print permission judgment unit 302.

The print permission judgment unit 302 acquires a print permission list from the list holding unit 303, and determines whether the received IP address is contained in the print permission list 401 (step S2). If it is determined that the received IP address is not included in the print permission list, the print permission judgment unit 302 transmits the received print job and the IP address to the job holding unit 304 (step S3).

The job holding unit 304 stores the received print job and the IP address into the HDD 211 (step S4), and starts time count by a timer (step S5). The timer has a set value which is set in advance to a time period of, e.g., one day or 12 hours, which can be changed to a desired time period by the manager of image forming apparatus.

The job holding unit 304 determines whether the time count by the timer reaches the set value (predetermined time period) and the timer is timed up (step S6). If the timer is not timed up, the print instruction unit 305 determines whether a print button 501 (see, FIG. 6) is depressed (step S7). The print button 501 is an example of a print instruction acceptance unit. If the print button 501 is not depressed, the process returns to step S6.

On the other hand, if it is determined that the print button 501 is depressed before the timer is timed up, the print instruction unit 305 transmits, to the list holding unit 303, the IP address stored together with the print job. The list holding unit 303 adds the received IP address to the print permission list (step S8).

The print instruction unit 305 transmits a print instruction to the job holding unit 304 (step S9). When receiving the print instruction, the job holding unit 304 transmits to the printing unit 306 the print job for which the print instruction is given (step S10).

The printing unit 306 develops the received print job into a bitmap, and prints the print job onto a sheet (step S11), whereupon the image forming apparatus 101 completes the present process.

On the other hand, if it is determined in step S2 that the received IP address is present in the print permission list, the print permission judgment unit 302 transmits the received print job to the printing unit 306 (step S12). Then, in step S11, the printing unit 306 develops the received print job into a bitmap, and prints the job onto a sheet.

If it is determined in step S6 that the timer is timed up, i.e., if it is determined that the predetermined time period has elapsed (no print instruction is accepted before the elapse of the predetermined time period), the job holding unit 304 deletes the stored (held) print job (step S13), whereupon the image forming apparatus 101 completes the present process.

It should be noted that when the print job is deleted in step S13, the image forming apparatus 101 can transmit, to a prescribed e-mail address of the manager of the image forming apparatus, an e-mail stating that the timer has been timed up and the print job has been deleted.

When the print job is transmitted in step S3 by the print permission judgment unit 302 to the job holding unit 304, the number and size of the print job are stored in association with the IP address of the host computer that has instructed the image forming apparatus 101 to print the print job. If the number or size of print jobs exceeds a prescribed number or size, the print job can immediately be deleted, whereby even if a large number of print jobs are transmitted from a host computer for which printing is not permitted, the storage region of the HDD 211 can be prevented from being undesirably consumed.

FIG. 6 shows an example screen for the print instruction unit 305. The print instruction unit 305 acquires from the job holding unit 304 a list of print jobs stored therein, and displays the acquired list on the operation panel 205. As shown in FIG. 6, the list of print jobs stored in the job holding unit 304 is displayed on the operation panel 205, whereby job acceptance numbers, job names, user names, IP addresses of host computers from which jobs have been transmitted, and job statuses can be confirmed. When the user selects a desired one of the print jobs on the screen and then depresses the print button 501, a print instruction is given. Whether the print button 501 is depressed is determined in step S7 in FIG. 5. When the user depresses a delete button 502, the selected print job is not printed but deleted.

It should be noted that a test print button can be added to the screen displayed on the operation panel 205 by the print instruction unit 305. When the test print button is depressed, a print instruction is given to print only the first page, but the IP address is not added to the print permission list, whereby the user is able to confirm whether the stored print job is one transmitted by the user, without the need of outputting all the pages.

FIG. 7 shows an example screen for the list management unit 307. The list management unit 307 acquires the print permission list held by the list holding unit 303 and displays it on the operation panel 205. The manager of image forming apparatus is able to add an IP address to the print permission list displayed on the screen and deletes an already held IP address therefrom.

As shown in FIG. 7, the list of IP addresses of host computers for which printing is currently permitted is displayed on the operation panel 205. When the manager selects any of the IP addresses on the screen and depresses a delete button 601, the selected IP address is deleted from the print permission list. When the manager depresses an add button 602, an IP address input screen (not shown) is displayed, and when an IP address is input on the screen by the manager, the input IP address is added to the print permission list. As a result, it is possible, for example, to disable any of the IP addresses of host computers for which printing has once been permitted, and enter in advance, into the print permission list, the IP address of a host computer for which printing is to be permitted.

It should be noted that FIG. 7 shows the example list where host computers for which printing should be permitted are identified in terms of their IP addresses. However, there may be used any information (other than IP addresses) by which host computers can be identified. Such information include, e.g., host names, MAC addresses, and serial numbers of host computers, and identification information uniquely set in advance for the host computers.

As described above, according to the image forming apparatus of the first embodiment, a print job is not immediately printed but is stored, if the print data (print job) is transmitted from a host computer that in the past has not instructed the image forming apparatus to execute printing. Accordingly, it is unnecessary for the manager to set authentication information to the image forming apparatus, whereby unauthorized printing can be prevented while reducing the manager's workload. Once the user has given an instruction to print print data (print job) stored in the image forming apparatus, printing is immediately executed as usual in the subsequent printing. It is therefore possible to enhance the security while maintaining user-friendliness.

(Second Embodiment)

In a second embodiment, in a case where there are a plurality of image forming apparatuses on the network and any of the image forming apparatuses adds an IP address to its print permission list, such information is notified to the other image forming apparatuses. As a result, if an instruction is given to print a print job temporarily stored in any of the image forming apparatuses on the network, printing subsequently instructed from the host computer having the notified IP address is automatically permitted also in the other image forming apparatuses, whereby the user's burden can be reduced.

The construction of the printing system and the hardware construction of the image forming apparatuses of the second embodiment are the same or similar to those of the first embodiment, and therefore a description thereof will be omitted. It is assumed that the image processing apparatuses of the second embodiment are each able to execute the processing shown in the flowchart of FIG. 5 in the first embodiment.

Figure 8:
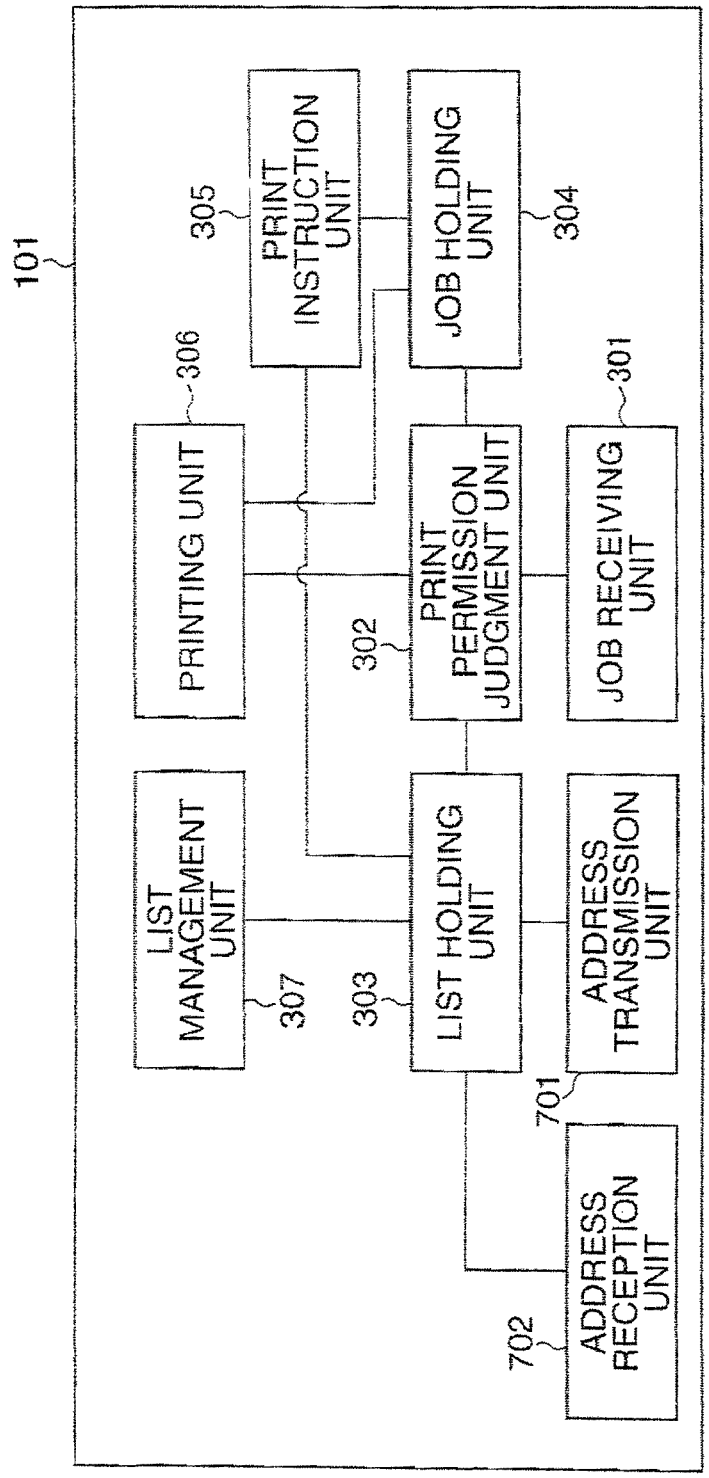
FIG. 8 is a block diagram showing the functional construction of software of each image forming apparatus according to a second embodiment of this invention.

FIG. 8 shows in block diagram the functional construction of software of each image forming apparatus of the second embodiment, in which the same function blocks as those of the first embodiment are denoted by the same reference numerals, with a description thereof omitted.

When an IP address is newly added to the print permission list held by the list holding unit 303, an address transmission unit 701 transmits the address information to the network 105. An address reception unit 702 receives address information from the network 105, and notifies the received IP address to the list holding unit 303.

As with the first embodiment, pieces of software for realizing the function blocks shown in FIG. 8 are stored in the HDD 211 or the ROM 203, are loaded as executable programs into the RAM 202 when the image forming apparatus is activated, and are subsequently concurrently executed by the CPU 201.

FIG. 9 shows in flowchart the procedures of processes performed by two image forming apparatuses when an IP address is newly added to the list holding unit 303 of one of the image forming apparatuses. In this example, there is described a case where an IP address is added to the image forming apparatus 101, and the IP address is received by the image forming apparatus 102. The process performed by the image forming apparatus 101 is shown on the left side of FIG. 9, and the process performed by the image forming apparatus 102 is shown on the right side of FIG. 9.

First, the list holding unit 303 of the image forming apparatus 101 receives an IP address to be added from the print instruction unit 305 or the list management unit 307, and adds the received IP address to the print permission list (step S21). This processing corresponds to step S8 in FIG. 5. The list holding unit 303 transmits the added IP address to the address transmission unit 701 (step S22). The address transmission unit 701 broadcast-transmits to the network 105 address information containing the received IP address in a format shown in FIG. 10 (step S23). The address transmission unit 701 is an example of a permission information transmission unit.

Subsequently, the image forming apparatus 101 completes the present process.

The address reception unit 702 of the image forming apparatus 102 receives the address information transmitted from the image forming apparatus 101 (step S31). The address reception unit 702 is an example of a permission information reception unit. The address reception unit 702 extracts an IP address from the received address information, and transmits the IP address to the list holding unit 303 (step S32). The list holding unit 303 adds the received IP address to the print permission list (step S33), whereupon the image forming apparatus 102 completes the present process.

FIG. 10 shows an example format of the address information transmitted from the address transmission unit 701 to the network 105. In this format, the IP address of image forming apparatus is set in a <DeviceAddress> tag, and the IP address of the host computer added to the print permission list is set in an <Address> field of an <AllowedAddress> tag.

As described above, with the image forming apparatus of the second embodiment, in a case where there are a plurality of image forming apparatuses on the network and an IP address is added to the print permission list of any of the image forming apparatuses, such information is notified to the other image forming apparatuses. As a result, if an instruction is given to print a print job temporarily stored in any of the image forming apparatuses on the network, printing subsequently instructed from the host computer having the notified IP address is automatically permitted also in the other image forming apparatuses, and therefore the user's burden is reduced.

It should be noted that in the second embodiment, not only the IP address of a host computer for which printing should be permitted but also the IP address of a host computer for which immediate printing should not be permitted can be notified between the image processing apparatuses 101, 102. It is assumed for example that a job is received in the flowchart of FIG. 5 and it is determined in step S6 that the predetermined time period has elapsed in the timer. In that case, there is a fear that an unauthorized print job not intended by the user is transmitted from a host computer due to, e.g., computer virus. Therefore, the IP address of the host computer recorded in the print permission lists of the other image processing apparatuses on the network, if any, should be deleted for safety purposes.

Accordingly, the IP address of the host computer having transmitted a job for which the predetermined time period has elapsed in the timer can be notified in step S22 and broadcasted in step S23 of FIG. 9, as the IP address to be deleted from the print permission list. In that case, the image forming apparatus 102 that receives the broadcasted IP address deletes the notified IP address, if any, from the print permission list.

It is assumed that an XML format as shown in FIG. 10 is used as a format for notifying the IP address to be deleted from the print permission list. However, as a tag indicating the IP address to be deleted from the print permission list, a tag <RestrictedAddressNotification> is used instead of the tag <AllowedAddressNotification> in FIG. 10. To distinguish from the IP address representing the host computer for which printing should be permitted, a tag <RestrictedAddress> is used instead of the tag <AllowedAddress> in FIG. 10.

By doing this, damages of the printing system due to unauthorized printing can be prevented from occurring.

(Third Embodiment)

In a third embodiment, an instruction to print a print job stored in the job holding unit 304 can be given not only from the operation panel 205 of each image forming apparatus but also from each host computer. Therefore, when using any of the image forming apparatuses for printing for the first time, the user is able to give a print instruction from his/her own PC and then go to get a print product to the image forming apparatus, whereby a wait time can be shortened as compared to a case to go to the image forming apparatus and then give a print instruction from the operation panel of the image forming apparatus.

Since the third embodiment not only includes the construction of the first embodiment but also includes an additional process to enable the user to provide a print instruction from any host computer, the operation described in the first embodiment and an operation described below can be made. The construction of the printing system and the hardware construction of image forming apparatuses in the third embodiment are the same as those of the first embodiment, and therefore a description thereof will be omitted. It should be noted that the process of the third embodiment can, of course, be applied to the image forming apparatuses of the second embodiment.

Figure 11:
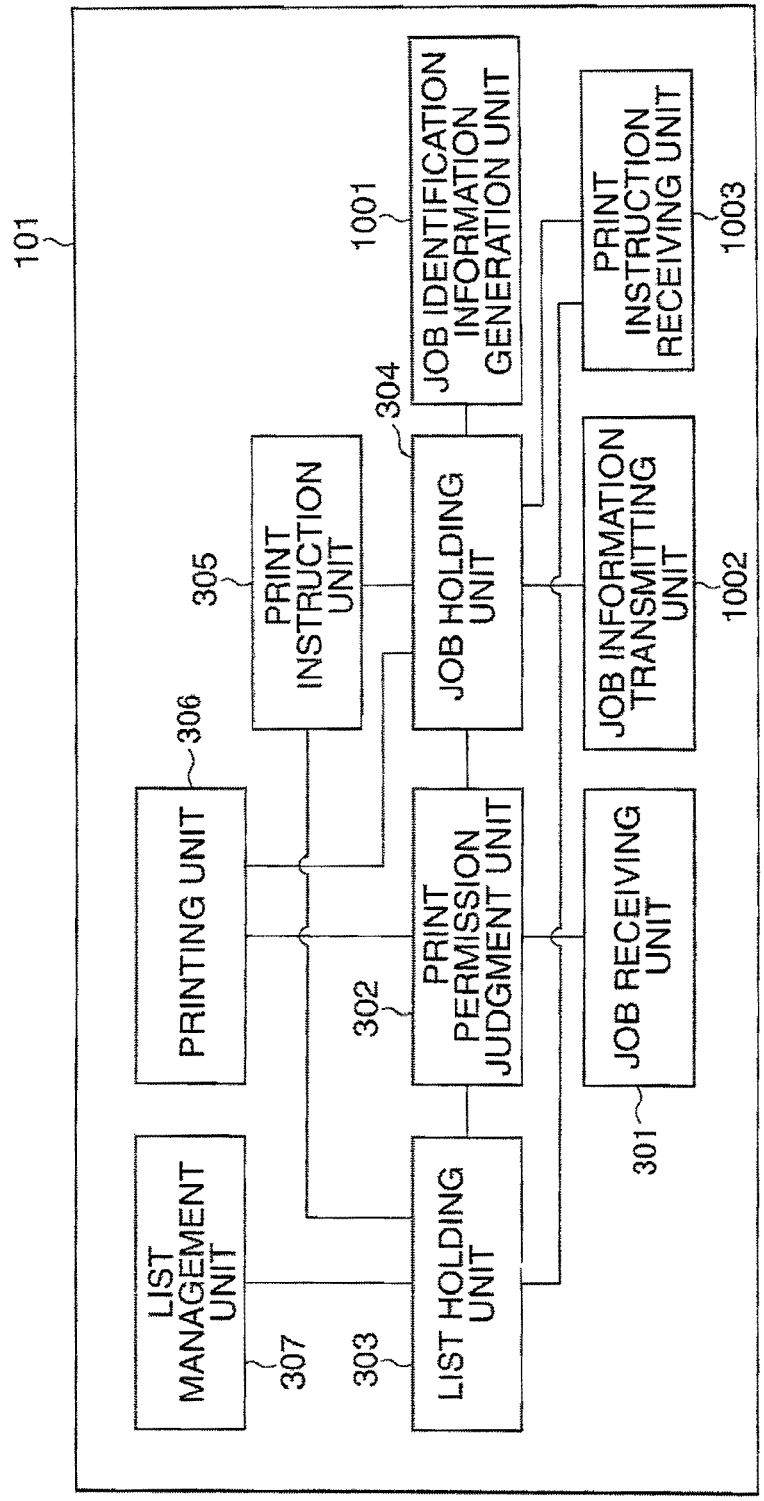
FIG. 11 is a block diagram showing the functional construction of software of each image forming apparatus according to a third embodiment of this invention.

FIG. 11 shows in block diagram the functional construction of software of the image forming apparatus 101 in the third embodiment. Function blocks which are the same as those of the first embodiment are denoted by the same reference numerals, with a description thereof omitted.

A job identification information generation unit 1001 generates information for uniquely identifying a print job stored in the job holding unit 304 (i.e., generates job identification information). A job information transmitting unit 1002 transmits job information containing the generated job identification information to a desired host computer. A print instruction receiving unit 1003 receives a print instruction from any of the host computers.

It should be noted that pieces of software for achieving the function blocks shown in FIG. 11 are stored in the HDD 211 or the ROM 203, are loaded as executable programs into the RAM 202 when the image forming apparatus is activated, and are subsequently concurrently executed by the CPU 201.

Figure 12:
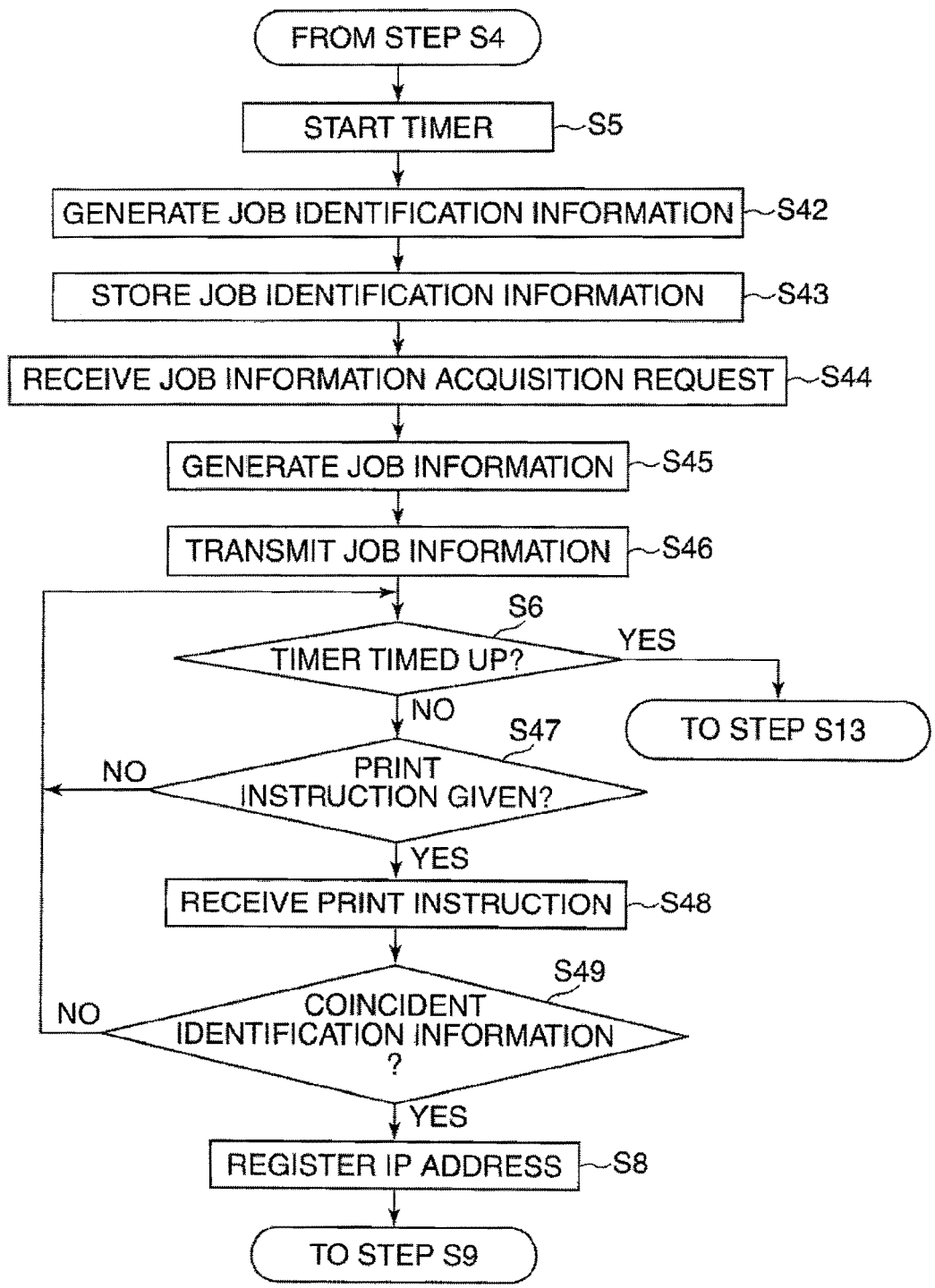
FIG. 12 is a flowchart showing the procedures of a printing process performed by the image forming apparatus when a print job is stored in a job holding unit shown in FIG. 11.

FIG. 12 shows in flowchart the procedures of a printing process performed by the image forming apparatus 101 when a print job is stored in the job holding unit 304. The flowchart of FIG. 12 includes a part of the flowchart of FIG. 5. In the flowchart of FIG. 12, steps for executing the same processing as those of the flowchart of FIG. 5 are denoted by the same reference numerals, with a description thereof omitted.

In the printing process of this embodiment, steps S1 to S5 of FIG. 5 are executed. As shown in FIG. 12, after completion of execution of step S5, the job holding unit 304 of the image forming apparatus 101 notifies to the job identification information generation unit 1001 that the print job is stored, and the job identification information generation unit 1001 generates job identification information for uniquely identifying the print job (step S42). As such job identification information, there is used, e.g., a random number value, a UUID (Universally Unique Identifier) generated based on the time at which the print job is stored, or the like.

The job holding unit 304 receives the generated job identification information from the job identification information generation unit 1001, and holds it into the HDD 211 (step S43). Subsequently, when the user opens a job screen of the image forming apparatus 101 from a web browser on the host computer, the job information transmitting unit 1002 receives a job information acquisition request from the web browser (step S44).

In response to the job information acquisition request, the job information transmitting unit 1002 acquires information on the print job stored in the job holding unit 304, and converts the acquired information into a format which can be displayed on the web browser to thereby generate job information (step S45).

Then, the job information transmitting unit 1002 transmits the converted job information (including job identification information) to the web browser (step S46). The job information transmitting unit 1002 is an example of an identification information transmission unit. As a result, a screen shown in FIG. 13 is displayed by the web browser. FIG. 13 shows a job list screen of the image forming apparatus 101 displayed by the web browser.

The user selects a job to be printed from the job list screen of FIG. 13 by marking any of checkboxes 1201, inputs job identification information (a desired one of job identifiers 1202) into a field 1203, and depresses a job print button 1204. By doing this, a print instruction is transmitted from the web browser to the print instruction receiving unit 1003.

After transmitting the job information, the image processing apparatus 101 determines whether a predetermined time period has elapsed in the timer (step S6). If it is determined that the predetermined time period has elapsed, the process proceeds to step S13 of FIG. 5 to delete the job, whereupon the printing process is completed. On the other hand, if the predetermined time period has not elapsed in the timer, the image processing apparatus 101 determines in step S47 whether a print instruction is given from any of the host computers. The process proceeds to step S6, if a print instruction is not given, and proceeds to step S48 if a print instruction is given.

The print instruction receiving unit 1003 receives the print instruction in step S48, and determines whether the job number and job identification information contained in the received print instruction coincide with those stored in the job holding unit 304 (step S49). If they do not coincide with one another, the process returns to step S6.

On the other hand, if the job number and job identification information coincide with the stored ones, the print instruction receiving unit 1003 transmits to the list holding unit 303 the IP address stored together with the print job, and the list holding unit 303 adds the received IP address to the print permission list (step S8), whereupon the process proceeds to step S9. In that case, steps S9 to S11 of FIG. 5 are executed.

It should be noted that in this embodiment, the job identification information generated by the job identification information generation unit 1001 and then transmitted to the host computer is text information. The job identification information to be transmitted can be image information, which can be read by a human but is difficult for a computer to identify. In that case, e.g., CAPTCHA (Completely Automated Turing Test To Tell Computers and Humans Apart) technique or the like can be applied. This technique is released in "CAPTCHA: Telling Humans and Computers Apart Automatically" (http://www.captcha.net/). By doing this, even if there is a program for performing unauthorized printing, it is difficult to give a print instruction without human intervention.

As described above, with the image forming apparatus of the third embodiment, the instruction to print a print job stored in the job holding unit 304 can be given not only from the operation panel of the image forming apparatus but also from any of the host computers. Therefore, when using the image forming apparatus for printing for the first time, the user is able to give a print instruction on his/her own PC and then go to get a print product to the image forming apparatus, whereby a wait time can be shortened as compared to a case to go to the image forming apparatus and then give the print instruction from the operation panel of the image forming apparatus.

(Fourth Embodiment)

In a fourth embodiment, each image forming apparatus holds upper limit print number per unit time information for every host computer, and temporarily stops printing when receiving from any host computer a print job exceeding the upper limit print number for that host computer. As a result, it is possible to stop printing based on the held upper limit print number in a case that due to virus or the like, an unauthorized print job is transmitted to any image forming apparatus from any host computer for which printing has once been permitted.

The construction of the printing system, the hardware construction of each image forming apparatus, and the functional construction of software are the same as those of the first embodiment, and therefore a description thereof will be omitted. The printing stop function of the fourth embodiment can, of course, be applied to the image forming apparatuses of the second and third embodiments.

Figure 14:
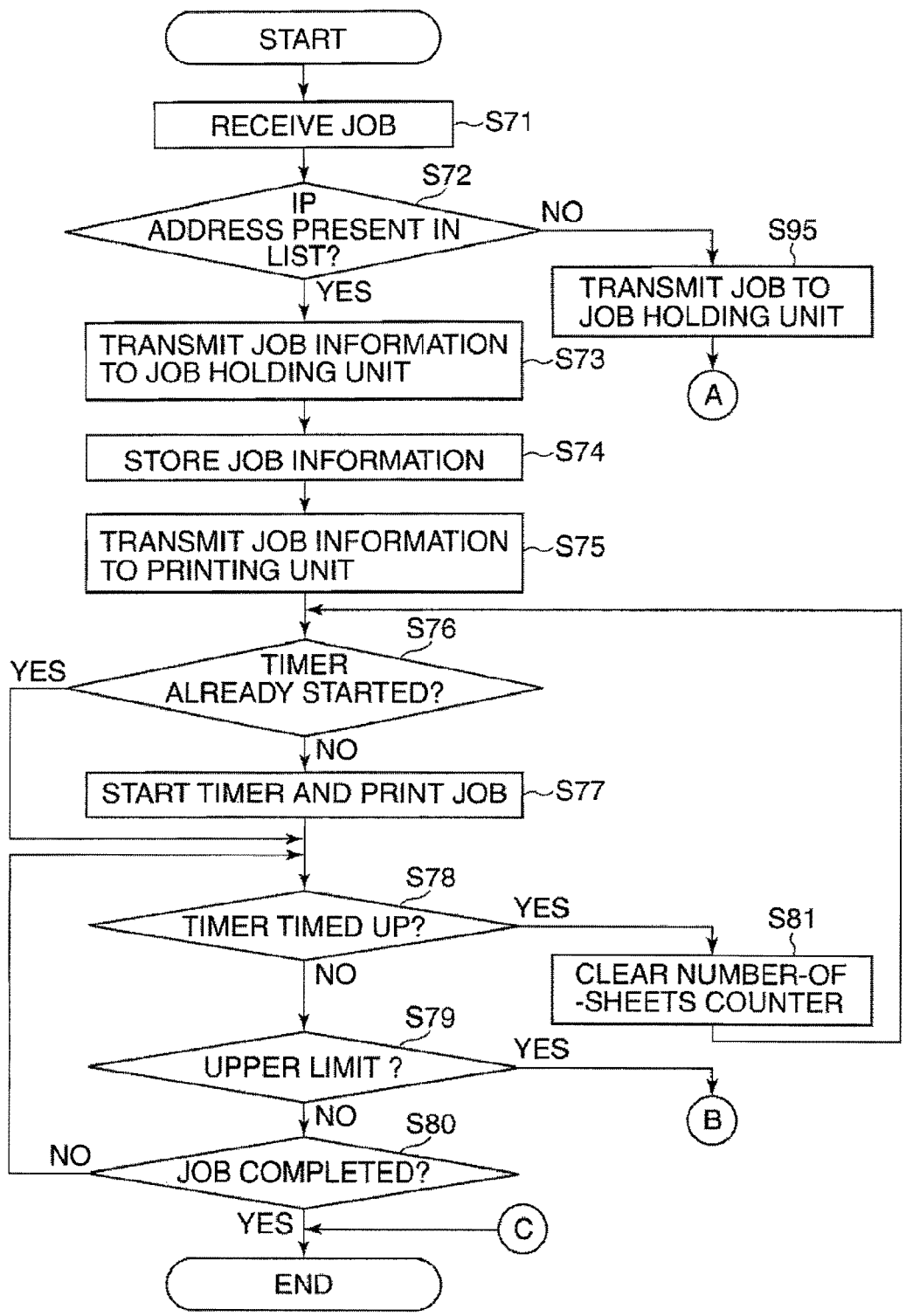
FIG. 14 is a flowchart showing a part of the procedures of a printing process performed by the image forming apparatus, which receives a print job, according to a fourth embodiment of this invention.
Figure 15:
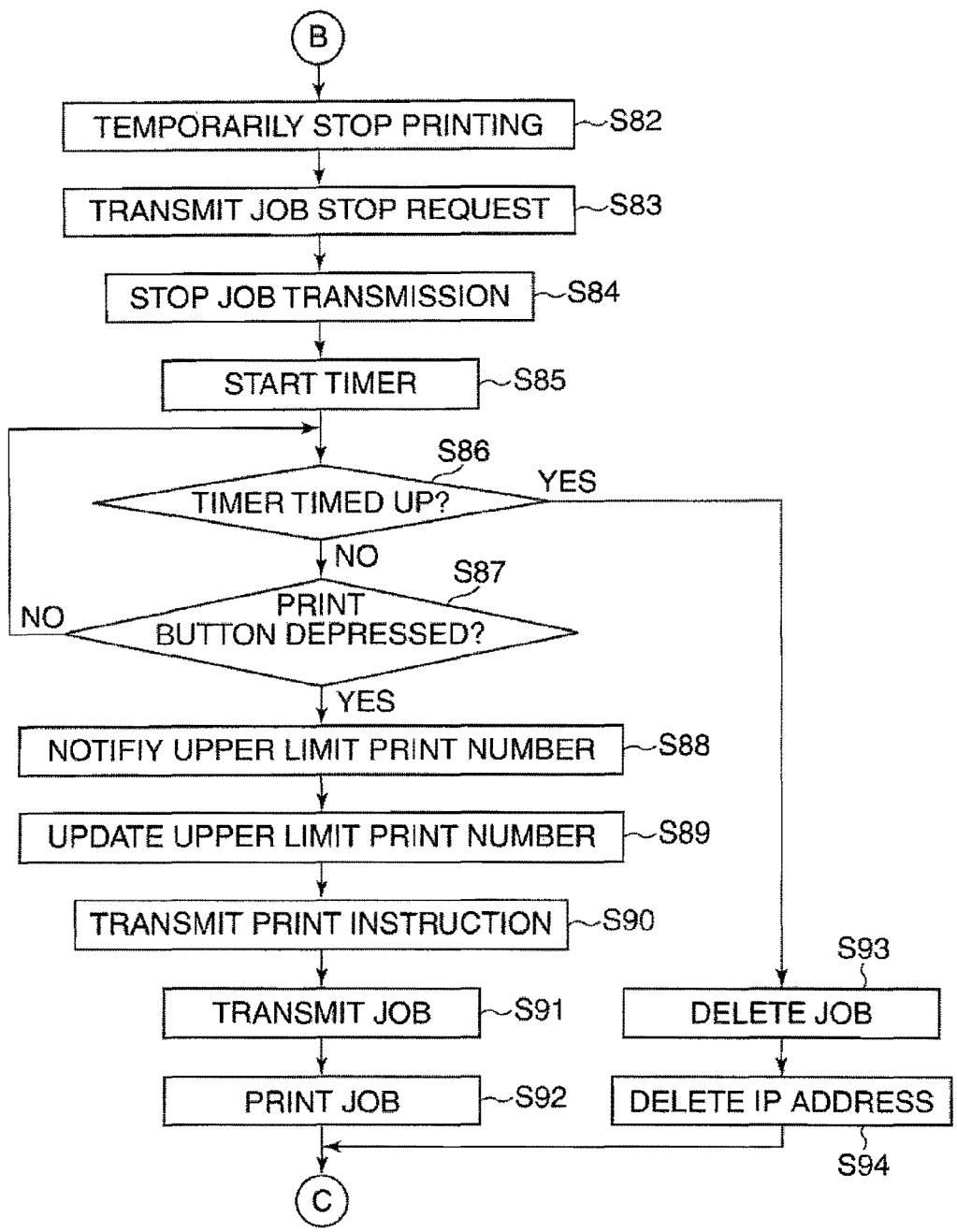
FIG. 15 is a flowchart showing another part of the procedures of the printing process that follows the part shown in FIG. 14.
Figure 16:
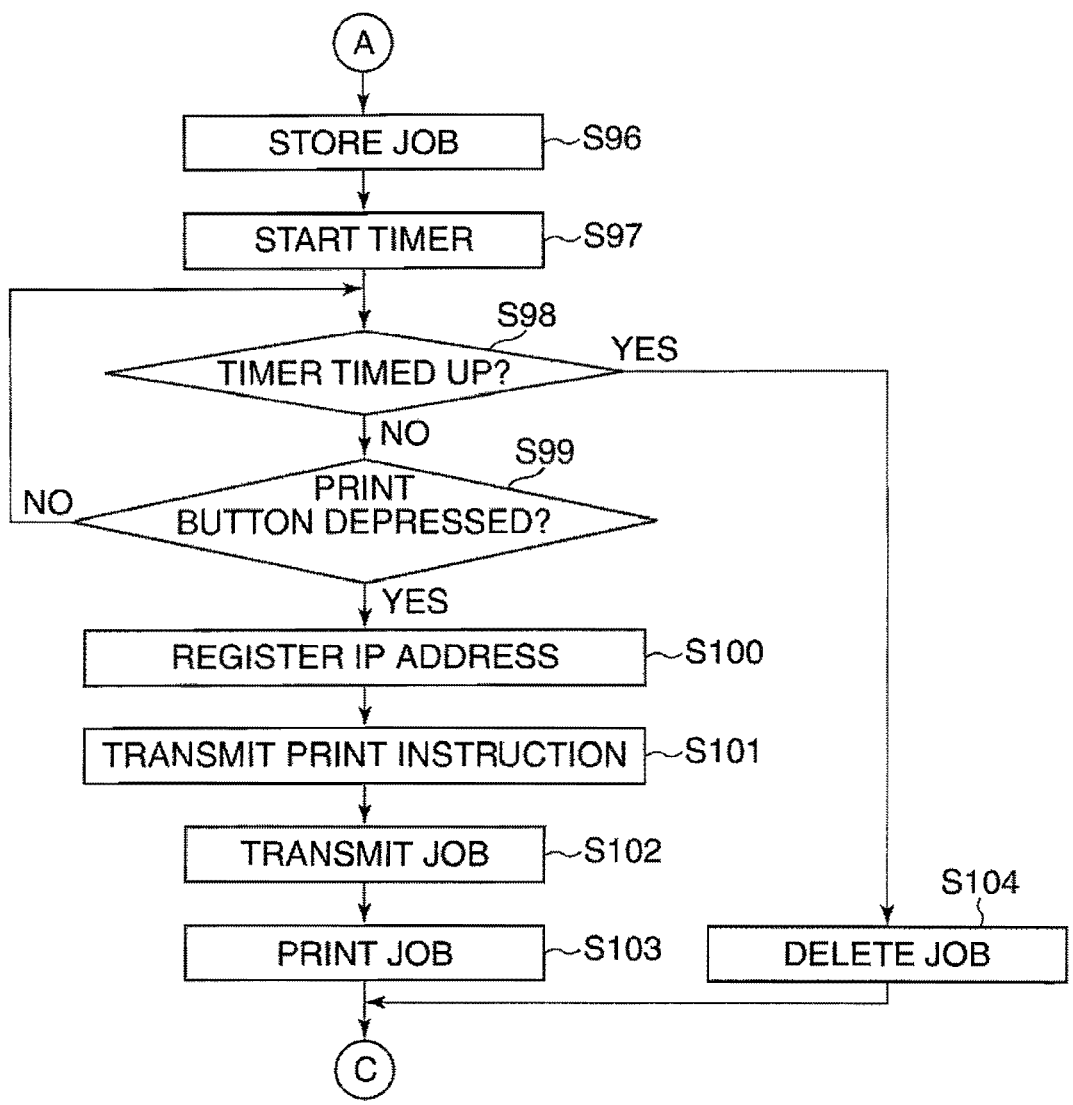
FIG. 16 is a flowchart showing the remaining part of the procedures of the printing process that follows the part shown in FIG. 14.

FIGS. 14 to 16 are flowcharts showing the procedures of a printing process performed by the image forming apparatus 101 of the fourth embodiment. In the printing process, the job receiving unit 301 of the image forming apparatus 101 receives a print job from, e.g., the host computer 103 (step S71), acquires the IP address of the host computer from which the print job has been transmitted, and transmits the received print job and the acquired IP address to the print permission judgment unit 302.

The print permission judgment unit 302 acquires a print permission list 1401 (see, FIG. 18) from the list holding unit 303, and determines whether the received IP address is contained in the print permission list (step S72). If it is determined that the received IP address is not contained in the print permission list, the print permission judgment unit 302 transmits print stop information, the received print job, and the IP address to the job holding unit 304 (step S95). Subsequently, in steps S96 to S104, the same processing as that performed in steps S4 to S13 in FIG. 5 of the first embodiment is performed. A description thereof is omitted.

On the other hand, if it is determined in step S72 that the received IP address is contained in the print permission list 1401, the print permission judgment unit 302 transmits, to the job holding unit 304, job information that includes print start information, upper limit print number information, received print job, and IP address (step S73).

The job holding unit 304 stores the received print job, IP address, and upper limit print number information into the HDD 211 (step S74), and transmits the print job, IP address, upper limit print number information to the printing unit 306 (step S75).

The printing unit 306 determines whether the timer is already started (step S76). If the timer is not started, the printing unit 306 starts the timer set with a predetermined time period (e.g., 5 minutes), and develops the received print job into a bitmap and prints the print job onto a sheet (step S77).

The printing unit 306 determines whether the timer is timed up (step S78). If the timer is not timed up, the printing unit 306 counts the number of sheets on which printing has been made, and determines whether the received upper limit print number is exceeded (step S79). The processing performed by the printing unit 306 in step S79 is an example of an upper limit judgment unit. If the upper limit print number is not exceeded, the printing unit 306 determines whether the printing of the print job is completed (step S80). If the printing of the print job is completed, the image forming apparatus 101 completes the present process. On the other hand, if the printing of the print job is not completed, the image forming apparatus 101 returns to step S78. Thus, the determinations in steps S79 and S80 are repeated until the timer is timed up.

It is determined in step S78 that the timer is timed up, the printing unit 306 clears the count of a number-of-sheets counter (step S81), and the process returns to step S76.

If it is determined in step S79 that the upper limit print number is exceeded, the printing unit 306 temporarily stops the printing (step S82), and transmits a job stop request to the job holding unit 304 (step S83).

When receiving the job stop request, the job holding unit 304 stops transmitting the print job to the printing unit 306 (step S84), and starts a timer (step S85). The timer is set in advance with a value, e.g., a time period of one day, which can be changed to a desired time period by the manager of the image forming apparatus.

The image forming apparatus 101 determines whether a time period elapsed in the timer exceeds the set value, i.e., whether the timer is timed up (step S86). Then, the print instruction unit 305 determines whether a print button 501 (see, FIG. 17) is depressed (step S87).

When the print button 501 is depressed, the print instruction unit 305 notifies to the list holding unit 303 the IP address and the upper limit print number information (which is e.g., "unlimited") (step S88).

The list holding unit 303 sets the upper limit print number for the host computer, having the same IP address as the received IP address, to "unlimited" (step S89). Then, the print instruction unit 305 transmits a print instruction to the job holding unit 304 (step S90).

When receiving the print instruction, the job holding unit 304 transmits to the printing unit 306 the print job whose transmission has been stopped (step S91). Then, the printing unit 306 develops the received print job into a bitmap, and restarts the printing onto a sheet (step S92), whereupon the present process is completed.

If it is determined in step S86 that the timer is timed up, the job holding unit 304 deletes the print job whose printing has temporarily been stopped, and transmits to the list holding unit 303 the IP address of the host computer from which the print job has been transmitted (step S93). The list holding unit 303 deletes the received IP address from the print permission list (step S94), whereupon the present process is completed.

It should be noted that in this embodiment, the upper limit print number is updated to "unlimited" in response to one print instruction. Alternatively, the upper limit print number can be updated to a new upper limit print number, which is equal to an actual print number at the time of job completion. If the printing based on a print instruction from the host computer whose upper limit print number has once been updated to "unlimited" is not performed for a given time period, the upper limit print number for that host computer can be returned to its initial value.

FIG. 17 shows an example screen for the print instruction unit 305. On the screen in FIG. 17, a list of one or more temporarily stopped print jobs is displayed, whereby job acceptance numbers, job names, user names, IP addresses of host computers from which these jobs have been transmitted, and job statuses can be confirmed. When the user selects any print job on the screen and depresses a print button 501, a print instruction is given. When the user depresses a delete button 502, the selected job is not printed but deleted.

FIG. 18 is a table showing an example of the print permission list held by the list holding unit 303. This table holds (registers) a list (print permission list) 1401 of IP addresses of and upper limit print numbers for host computers for each of which printing is permitted. The upper limit print numbers for respective IP addresses initially have predetermined values, but are automatically updated by the processing in step S89. In this embodiment, each of the upper limit print numbers is an upper limit print number per predetermined time period (e.g., 5 minutes). The list holding unit 303 for holding the print permission list 1401 including the upper limit print numbers is an example of an upper limit print number holding unit.

As described above, each image forming apparatus in the fourth embodiment holds upper limit print number per unit time information for every host computer, and temporarily stops printing when receiving from any host computer a print job exceeding the upper limit print number for that host computer. As a result, it is possible to stop the printing based on the held upper limit print number in a case that due to virus or the like, an unauthorized print job is transmitted to any image forming apparatus from any host computer for which printing has once been permitted.

It should be noted that this invention is not limited in construction to the above described embodiments, and is applicable to any construction having functions defined in claims appended herein or capable of achieving the functions of the embodiments.

For example, each image forming apparatus can of course be implemented by not only a copying machine but also a printing apparatus, a facsimile machine having a printing function, or a multifunction peripheral (MFP) having printing, copying, and scanner functions, etc.

This invention is not limited to an electrophotographic image forming apparatus, and is also applicable to printing methods such as an ink jet method, thermal transfer method, thermography method, electrostatic method, and discharge breakdown method.

Sheets for use in the image forming apparatuses are not limited to particular ones but may be paper media, OHP sheets, heavy sheets of paper, etc.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-296732, filed Nov. 20, 2008, which is hereby incorporated by reference herein in its entirety.

What is claimed is:

1. An image forming apparatus for printing a print job, comprising:
   a storage unit configured to store a list including information that identifies at least one information processing apparatus;
   a receiving unit configured to receive a print job transmitted from an information processing apparatus;
   a determination unit configured to determine whether information that identifies the information processing apparatus from which the received print job has been transmitted is included in the list;
   a job holding unit configured to hold the received print job which has been transmitted from the information processing apparatus that is identified by the information not included in the list;
   a print instruction acceptance unit configured to accept a print instruction for the held print job, after the held print job has been received by said receiving unit;
   a printing unit configured to print the held print job according to the print instruction being accepted by said print instruction acceptance unit, in a case where it is determined, by said determination unit, that the information that identifies the information processing apparatus from which the received print job has been transmitted is not included in the list, and to print the received print job without waiting for a print instruction for the received print job to be accepted after the received print job has been received by said receiving unit, in a case where it is determined, by said determination unit, that the information that identifies the information processing apparatus from which the received print job has been transmitted is included in the list; and
   a registration unit configured to register, in the list, the information that identifies the information processing apparatus having transmitted the print job for which the print instruction has been accepted by said print instruction acceptance unit.

2. The image forming apparatus according to claim 1, wherein said job holding unit deletes the print job in a case where a predetermined time period elapses and the print instruction is not accepted by said print instruction acceptance unit.

3. The image forming apparatus according to claim 1, including:
  a permission information transmission unit configured to transmit, to at least one other image forming apparatus, information that identifies an information processing apparatus for which printing is permitted; and
  a permission information reception unit configured to receive, from at least one other image forming apparatus, information that identifies an information processing apparatus for which printing is permitted,
wherein said registration unit registers the information received by said permission information reception unit.

4. The image forming apparatus according to claim 1, further including:
  an operation unit configured to accept an operation instruction for the image forming apparatus,
  wherein said print instruction acceptance unit accepts, via said operation unit, the print instruction for the held print job.

5. The image forming apparatus according to claim 1, including:
  an upper limit number holding unit configured to hold an upper limit print number for every information processing apparatus for which printing is permitted;
  an upper limit judgment unit configured to determine whether the upper limit print number is exceeded during printing of the print job;
  a stop unit configured to temporarily stop the printing of the print job in a case where it is determined by said upper limit judgment unit that the upper limit print number is exceeded;
  a restart unit to configured to restart the printing of the stopped print job; and
  an update unit configured to update the upper limit print number for the information processing apparatus from which the restarted print job has been transmitted.

6. The image forming apparatus according to claim 5, wherein said upper limit number holding unit holds the upper limit print number per predetermined time period.

7. The image forming apparatus according to claim 1, further comprising:
  a display unit configured to display the print job held by said job holding unit, wherein said print instruction acceptance unit accepts the print instruction for the print job being selected on the display unit.

8. The image forming apparatus according to claim 1, wherein said print instruction acceptance unit is configured to accept the print instruction for the held print job from the information processing apparatus.

9. The image forming apparatus according to claim 8, further including:
  an identification information generation unit configured to generate job identification information that identifies the print job which has been received by said receiving unit; and
  an identification information transmission unit configured to transmit the generated job identification information to an information processing apparatus from which the print job identified by the job identification information has been transmitted,
  wherein said print instruction acceptance unit accepts the print instruction containing the job identification information, received from the information processing apparatus, and
  said printing unit prints the print job identified by the job identification information.

10. A control method for an image forming apparatus for printing a print job, comprising:
  receiving a print job transmitted from an information processing apparatus;
  determining whether information that identifies the information processing apparatus from which the received print job has been transmitted is included in a list including information that identifies at least one information processing apparatus;
  holding the received print job which has been transmitted from the information processing apparatus that is identified by the information not included in the list;
  accepting by the image forming apparatus a print instruction for the held print job, after the held print job has been received;
  printing the held print job by the image forming apparatus according to the print instruction being accepted by the image forming apparatus, in a case where it is determined that the information that identifies the information processing apparatus from which the received print job has been transmitted is not included in the list;
  registering, in the list, information that identifies the information processing apparatus having transmitted the print job for which the print instruction has been accepted by the image forming apparatus; and
  printing the received print job without waiting for a print instruction for the received print job to be accepted after the received print job has been received, in a case where it is determined that the information that identifies the information processing apparatus from which the received print job has been transmitted is included in the list.

11. A non-transitory computer-readable storage medium storing a control program for causing an image forming apparatus to:
  determine whether information that identifies an information processing apparatus from which a received print job has been transmitted is included in a list including information that identifies at least one information processing apparatus;
  store, in a storage, the received print job which has been transmitted from the information processing apparatus that is identified by the information not included in the list;
  accept a print instruction for the stored print job, after the stored print lob has been received;
  execute the stored print job according to the print instruction being accepted by the image forming apparatus, in a case where it is determined that the information that identifies the information processing apparatus from which the received print job has been transmitted is not included in the list;
  register, in the list, information that identifies the information processing apparatus having transmitted the print job for which the print instruction has been accepted; and
  execute the received print job without waiting for a print instruction for the received print job after the received print job has been received, in a case where it is determined that the information that identifies the information processing apparatus from which the received print job has been transmitted is included in the list.

* * * * *